(12) United States Patent
Frei et al.

(10) Patent No.: US 7,949,947 B2
(45) Date of Patent: May 24, 2011

(54) METHOD AND SYSTEM FOR BI-DIRECTIONAL DATA CONVERSION BETWEEN IEC 61970 AND IEC 61850

(75) Inventors: Christian Frei, Fislisbach (CH); Otto Preiss, Zeihen (CH); Tatjana Kostic, Niederrohrdorf (CH)

(73) Assignee: ABB Research Ltd, Zurich (CH)

( * ) Notice: Subject to any disclaimer, the term of this patent is extended or adjusted under 35 U.S.C. 154(b) by 1103 days.

(21) Appl. No.: 11/707,170

(22) Filed: Feb. 16, 2007

(65) Prior Publication Data
US 2007/0185591 A1 Aug. 9, 2007

Related U.S. Application Data

(63) Continuation of application No. PCT/CH2004/000510, filed on Aug. 16, 2004.

(51) Int. Cl.
*G06F 17/00* (2006.01)
(52) U.S. Cl. .................................................. 715/239
(58) Field of Classification Search .................. 715/200, 715/239
See application file for complete search history.

(56) References Cited

U.S. PATENT DOCUMENTS

| | | | |
|---|---|---|---|
| 6,985,912 B2* | 1/2006 | Mullins et al. ........................ 1/1 |
| 7,139,975 B2* | 11/2006 | Suzuki et al. .................. 715/236 |
| 7,603,332 B2* | 10/2009 | Hogan .............................. 706/47 |
| 2001/0056445 A1* | 12/2001 | Meystel et al. ............... 707/513 |
| 2002/0002566 A1* | 1/2002 | Gajraj .......................... 707/513 |
| 2002/0059566 A1 | 5/2002 | Delcambre et al. |
| 2003/0149934 A1* | 8/2003 | Worden ........................ 715/513 |
| 2003/0188299 A1* | 10/2003 | Broughton et al. ........... 717/141 |
| 2004/0083222 A1* | 4/2004 | Pecherer ....................... 707/100 |
| 2005/0091626 A1* | 4/2005 | Okano et al. ................... 716/11 |
| 2007/0124709 A1* | 5/2007 | Li et al. ............................ 716/5 |
| 2007/0250303 A1* | 10/2007 | Imai et al. ....................... 703/22 |
| 2008/0306727 A1* | 12/2008 | Thurmair et al. ................. 704/4 |
| 2010/0063974 A1* | 3/2010 | Papadimitriou et al. ...... 707/758 |

(Continued)

FOREIGN PATENT DOCUMENTS

WO 03/083600 A2 10/2003

OTHER PUBLICATIONS

Brand, The Standard IEC 61850 as Prerequisite for Intelligent Applications in Substations, Google 2004, pp. 1-5.*

(Continued)

*Primary Examiner* — Cong-Lac Huynh
(74) *Attorney, Agent, or Firm* — Buchanan Ingersoll & Rooney PC

(57) ABSTRACT

A system and method of converting a file is disclosed that is based on a first standard to a file that is based on a second standard. The concerned standards can be IEC 61970 and IEC 61850 or their equivalents. For conversion, a file based on IEC 61970 is coded according to CIMXML (RDF Schema), and a file in IEC 61850 is coded according to SCL (XML Schema). The data in each file is modelled by using a UML model for the corresponding standard. The method includes the automatic generation of mapping rules that can be based on the UML models of the two standards and the mappings between the two standards. The method further converts the identified elements by using the generated mapping rules. Finally, post-processing rules can be applied to the converted elements to generate the file, based on the second standard.

12 Claims, 7 Drawing Sheets

U.S. PATENT DOCUMENTS

2010/0211490 A1*  8/2010  Itoh et al. ..................... 705/34

OTHER PUBLICATIONS

Schwarz, IEC 61850 Also Outside the Substation for the Whole Electrical Power System, Google 2005, pp. 1-7.*

Berry, Standard for Energy Management System Application Program Interfaces, IEEE 2000, pp. 1-6.*

Tatjana Kostic et al., "Towards the Formal Integration of Two Upcoming Standards: IEC61970 and IEC61850", 2003 Large Engineering Systems Conference on Power Engineering (Lescope), May 7, 2003, pp. 24-29.

Karlheinz Schwarz, "Information models and information exchange for electric power systems", Mar. 2, 2004, pp. 1-39.

* cited by examiner

METHOD AND SYSTEM FOR BI-DIRECTIONAL DATA CONVERSION BETWEEN IEC 61970 AND IEC 61850

RELATED APPLICATIONS

This application is a continuation application under 35 U.S.C. §120 to PCT/CH2004/000510 filed as an International Application on 16 Aug. 2004 designating the U.S., the entire contents of which are hereby incorporated by reference in their entireties.

FIELD

The disclosure relates to utility control systems in substations and control centres, and, more particularly, relates to conversion of data between IEC 61970 standard and IEC 61850 standard, and vice versa.

BACKGROUND INFORMATION

Utility control systems in Substation Automation Systems (SAS) and control centres in a power system network together serve to monitor, supervise, control, and protect the power network to economically provide high quality electricity in a reliable manner. The operation of the power system network can be improved by ensuring a higher degree of integration of control centre applications and SAS applications. The integration requires exchange of data between SAS and the control centre. This data exchange relates to both—the system configuration data used at the time of system/application engineering and integration, and the live data used at systems' runtime.

SAS and control centres use different standards, according to which the corresponding data is modelled. In particular, the two International Electrotechnical Commission (IEC) standards used are IEC 61850 at the SAS, and the Common Information Model (CIM) of IEC 61970 at the control centres.

Exchange of data between such systems is essential if the systems are to be integrated or interoperated. However, the data modelled, based on a particular standard is not accessible to systems that use data modelled, based on another standard. This limits interoperability between systems that use data modelled, based on different standards. Data exchange between such systems requires data models to be mapped between the two standards.

Generally, the amount of data to be converted is large. This makes the mapping of data between the standards a tedious task. Further, the understanding and preservation of the involved semantics makes the task of data mapping complex. The mapping requires a syntactically and semantically accurate conversion. As a result, the conversion of data from IEC 61970 to IEC 61850, and vice versa, is difficult due to the complexity of the data models in the two standards.

IEC 61970 defines an Application Program Interface (API) for an Energy Management System (EMS). IEC 61970 defines, amongst others, a data model for control centre systems/applications. A Common Information Model (CIM) specifies the semantics of the API. The CIM is an abstract model that represents all the major elements in a control centre system, that are typically needed to model the operational aspects of the control centre system. The CIM can be used in a variety of applications to enable integration. In particular, the CIM is used wherever a common power system model is needed to facilitate interoperability and plug compatibility between applications and systems independent of any particular implementation.

The IEC 61850 is a standard that defines, amongst others, a data model for Substation Automation systems (SAS), and is a standard for communications within a substation. IEC 61850 contains a device model, which describes the function allocation as well as the properties of each physical device. IEC 61850 provides a data model for Logical Nodes (LN). LNs are the atomic functional building blocks of an SAS and contain the data and attributes of the respective elements. IEC 61850 also defines the Substation Configuration Language (SCL), an eXtensible Markup Language (XML) Schema, to configure the substation and for file exchange of configuration data.

Efforts have been made to enable the conversion of data in one standard to another. U.S. patent application No. 'US2002059566', titled 'Uni-level description of computer information and transformation of computer information between representation schemes' provides a system and method for transforming selected computer information described by using one model of data representation to computer information described by using a second model of data representation. The transformation involves expressing the selected computer information in a uni-level description scheme. The uni-level description scheme uses basic structures that represent the selected computer information, with reference to a generic set of abstractions applicable to representation schemes with different model structures. Following this, the selected computer information is transformed and expressed in the uni-level description to the second representation scheme.

The article by T. Kostic et al entitled "Towards the formal integration of two upcoming standards: IEC61970 and IEC61850", Proc. of 2003 LESCOPE conference, Montreal, May 7-9, 2003, pp. 24-29, describes an attempt to create a bi-directional mapping of IEC 61850 to IEC 61970 data representations for a limited number of elements of a substation. To this end, in addition to the Unified Modelling Language (UML) based representations that are an integral part of the IEC 61970, a UML model of the IEC 61850 was developed and a UML model of the mappings between the two standards was built.

SUMMARY

A method is disclosed for converting selected elements of a file that is based on a first standard to elements of a file that is based on a second standard, and vice versa. The involved standards can be IEC 61970 and IEC 61850 or their equivalents. A file in IEC 61970 is coded according to Resource Description Framework (RDF) Schema and a file in IEC 61850 is coded according to XML Schema. The data in each file can be modelled by using a UML model for the corresponding standard. An exemplary method includes automatically generating mapping rules that can be based on the UML models of the two involved standards and the UML model for mappings between the two standards. Elements related to the selected elements of the file based on the first standard are identified during the conversion process and likewise converted. All identified elements can be converted by using the generated mapping rules. Post-processing rules can be applied to the converted elements to generate the file, based on the second standard.

In another aspect, a semi-automatic converter is disclosed for converting selected elements of a file in the first standard to elements of a file in the second standard, and vice versa. The standards can be IEC 61970 and IEC 61850 or their equivalents. The semi-automatic converter includes means for automatically generating the mapping rules, based on the UML models of the two standards and the UML model for mappings between the two standards, means for identifying, during the conversion process, elements related to the selected elements to be converted, and means for converting all identified elements by using the generated mapping rules.

BRIEF DESCRIPTION OF THE DRAWINGS

The subject matter of the invention will be explained in more detail in the following text with reference to the exemplary embodiments illustrated in the attached drawings, of which.

The reference symbols used in the drawings, and their meanings, are listed in summary form in the list of reference symbols. In principle, identical parts are provided with the same reference symbols in the figures.

DETAILED DESCRIPTION

Data exchange between systems and applications can be based on International Electrotechnical Commission standards, e.g., IEC 61970 and IEC 61850, for the interoperability and integration of such systems. The data exchange involves conversion of data based on IEC 61970 to IEC 61850, and vice versa. This involves a syntactically and semantically correct conversion and mapping of the data objects of IEC 61970 and IEC 61850. A system, a method and a computer program product are disclosed to semi-automatically perform the conversion.

Figure 1:
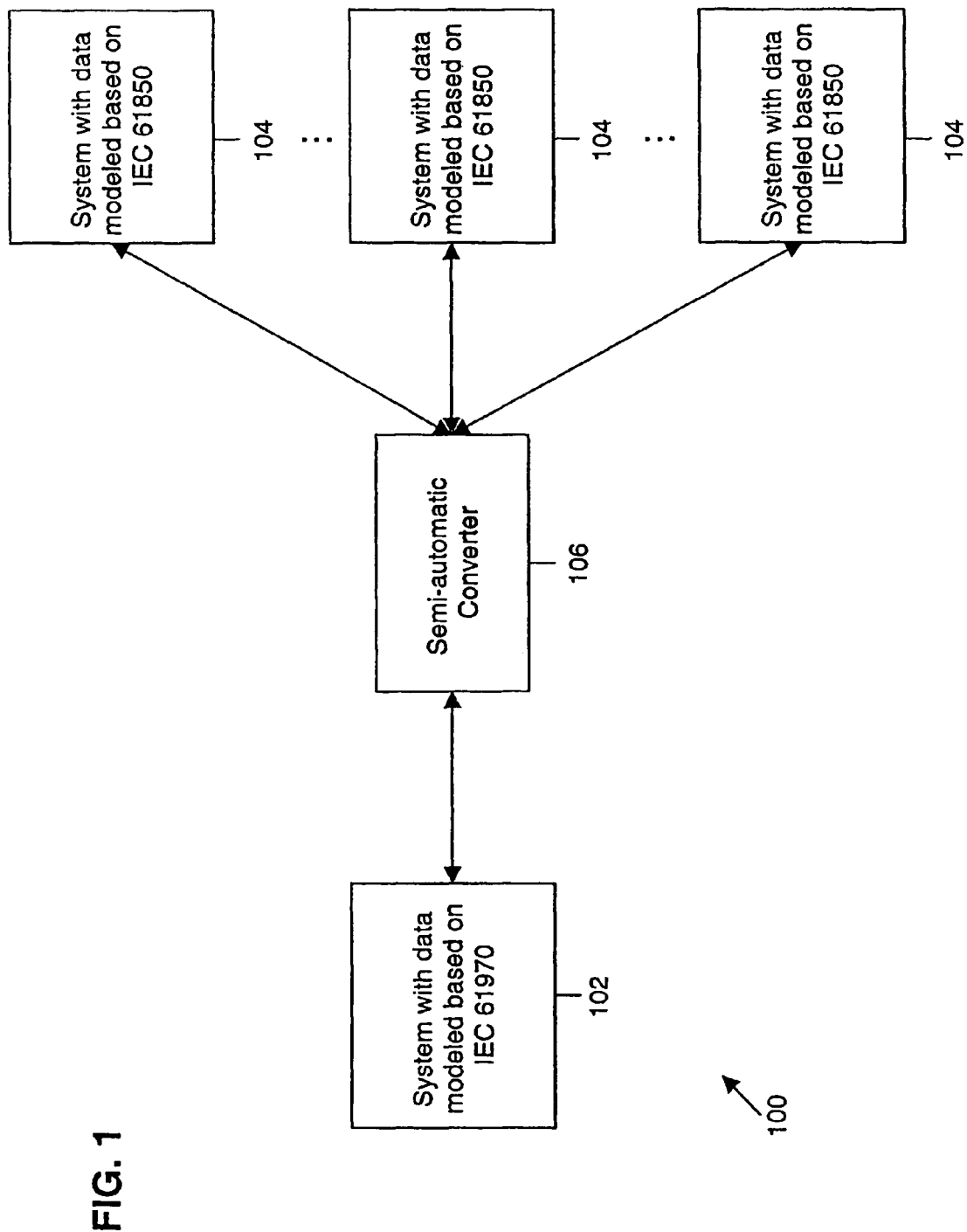
FIG. 1 schematically depicts the basic elements of a utility control system, according to exemplary embodiments.

FIG. 1 schematically depicts the basic elements of a utility control system, according to the exemplary embodiments. Utility control system 100 comprises a system 102 with data modelled, based upon IEC 61970, and at least one system 104 with data modelled, based upon the IEC 61850 standard. In an exemplary embodiment, system 102 is a control centre system and system 104 is a Substation Automation System (SAS). An exemplary semi-automatic converter 106 enables the integration and interoperability of system 102 and system(s) 104. For the integration and interoperability of the two systems, data exchange between these systems is required. The data refers to, for example, system configuration data and live data used during system runtime exchange. The data comprises data related to various elements comprised in each of systems 102 and 104. Since the systems are based on different standards, the data exchange involves the conversion of files containing the data, and modelling the file data based on the first standard to a file based on a second standard, and vice versa. Semi-automatic converter 106 enables this conversion.

Abstract models of system 102 and system 104 provide overviews of elements comprised within the corresponding systems. For example, the abstract model of system 102 may comprise elements such as 'Terminal', 'Substation', 'VoltageLevel', 'Bay', 'BaseVoltage' and 'BasePower'. The abstract model of system 102 can be based on CIM. The abstract models of system 102, as well as of system 104, can be modelled by using a Unified Modelling Language (UML) model.

Figure 2:
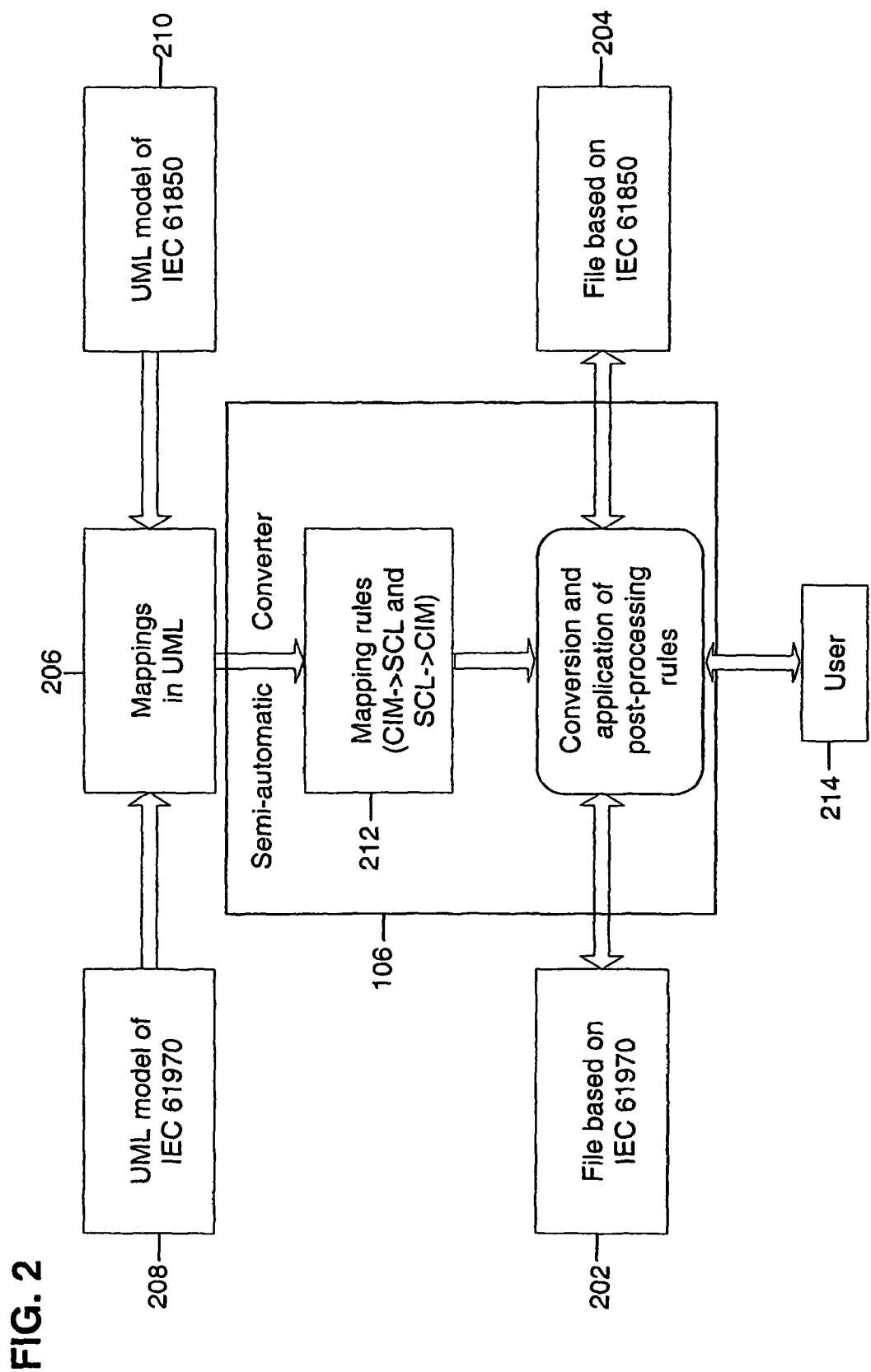
FIG. 2 schematically depicts the interaction required for the process of the conversion of an exemplary file based on IEC 61970 to a file based on IEC 61850 and vice versa, according to an exemplary embodiment.

Semi-automatic converter 106 is described in detail with reference to FIG. 2 and FIG. 3. FIG. 2 schematically depicts the interaction required for the process of conversion of a file 202, based on IEC 61970, to a file 204 based on IEC 61850, and vice versa, according to an exemplary embodiment. As described earlier, semi-automatic converter 106 performs the conversion of file 202 to file 204, and vice versa. For the purpose of conversion, assume that file 202 is to be converted.

The data, in the form of files such as configuration files, is provided to semi-automatic converter 106 for conversion. Configuration files, for example, contain data related to the various elements of the system, such as elements contained in the abstract model. File 202, corresponding to system 102, can be coded according to CIMXML, an RDF Schema. For example, files created for CIM interoperability tests can be used for the purpose. File 204, corresponding to system 104, can be coded according to SCL, an XML Schema (Part 6 of IEC 61850). File 202 or 204 is provided to semi-automatic converter 106 if a conversion from IEC 61970 to IEC 61850, or vice versa is to be performed, respectively. Hence, an exemplary semi-automatic converter 106 converts a file coded according to CIMXML, that is based on IEC 61970, to a file coded according to SCL, that is based on IEC 61850, and vice versa.

Semi-automatic converter 106 uses UML model of mappings 206 and the abstract models of system 102 and system 104. UML model 208 and UML model 210 are the abstract models based on system 102 and system 104, respectively. Two sets of mapping rules 212: one for mappings from IEC 61970 to IEC 61850 and one for mappings from IEC 61850 to IEC 61970, are then derived from UML model of mappings 206. Mapping rules 212 can be coded according to the RDF schema and aid in converting a file based on IEC 61970 to a file based on IEC 61850, and vice versa.

Semi-automatic converter 106 then performs the conversion, based on mapping rules 212, and may require intervention by a user 214 in addition to the use of mapping rules 212, to perform the required conversion. The conversion, as described earlier, involves identifying applicable mapping rules 212 and applying the identified mapping rules to the elements to be converted, thereby generating converted elements. File 204 is generated after the application of post-processing rules.

Semi-automatic converter 106 has a Human Machine Interface (HMI) that can be used by user 214 to input data or control the conversion wherever necessary. Mappings 206 in UML can be modelled by a person having knowledge of both the standards. All the three UML models are stored in a file system, in the format determined by CASE tool. For example, CASE tool, Rational Rose™ 2003 (service release 12), a product of IBM, can be used. The CASE tool provides a way of representing systems, which can be complex to comprehend in their source code or schema-based form, in a way that the design becomes apparent and easy to understand. Specifically, the CASE tool enables a source code to be parsed and represented within UML.

Figure 3:
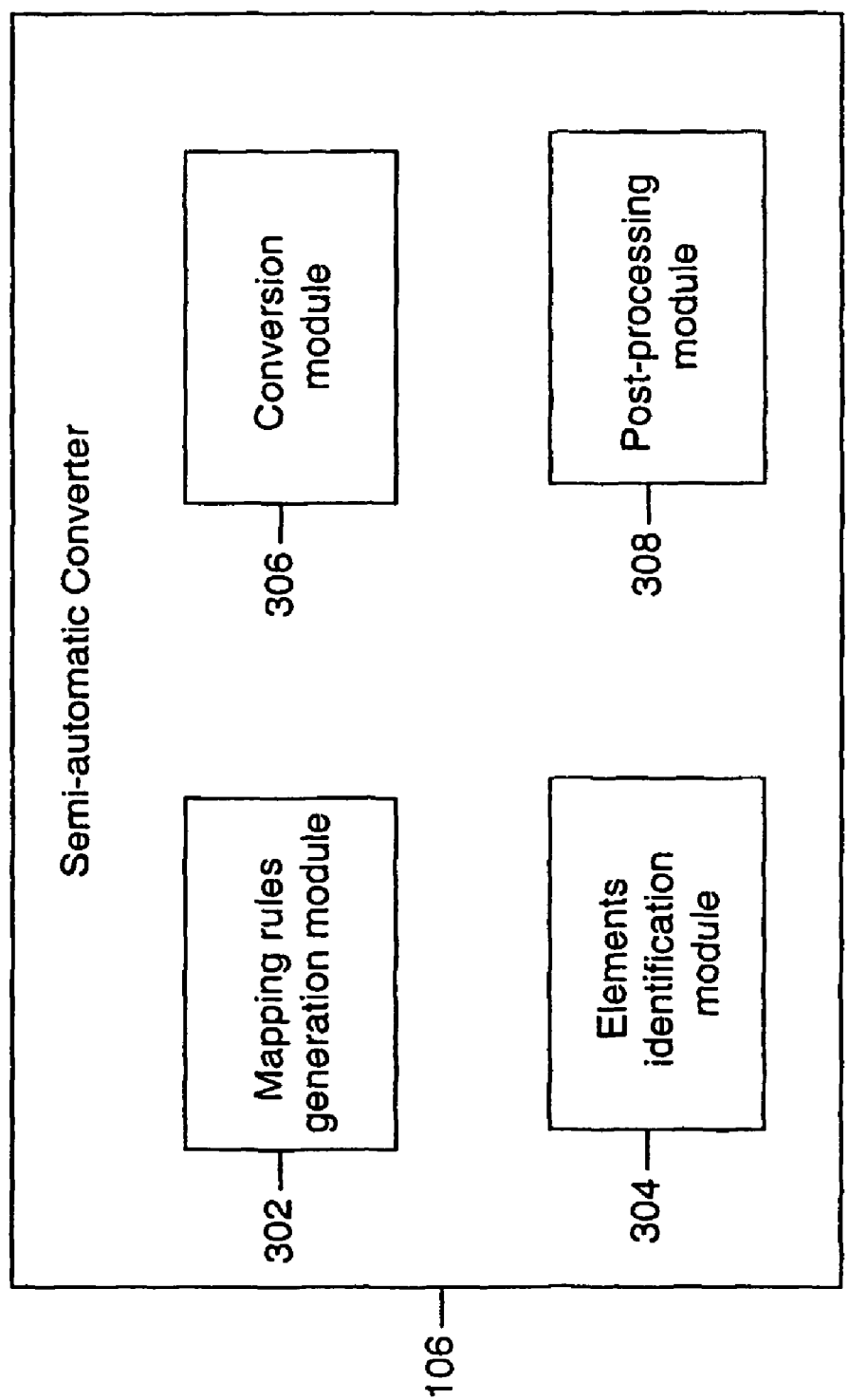
FIG. 3 schematically depicts exemplary blocks of a semi-automatic converter, according to an exemplary embodiment.

FIG. 3 schematically depicts the modules of semi-automatic converter 106, according to an exemplary embodiment.

A mapping rules generation module 302 generates the two sets of mapping rules. Mapping rules generation module 302 relies on the three UML models: UML model 208 of IEC 61970, UML model 210 of IEC 61850, and UML model of mappings 206 between them. For a given version of the three UML models, mapping rules generation module 302 generates two sets of mapping rules only once. Those rules can be further used for conversion between instance files based on IEC 61970 and IEC 61850, and vice versa. The mapping rules are regenerated only if any of UML models 208, 210 and 206 changes. Mapping rules generation module 302 utilizes an open source UML-to-RDF translator Xpetal, published by LangDale Consultants. Xpetal is available under Lower General Public License (LGPL). Xpetal has been designed in the Java programming language for converting any abstract model expressed in UML to the corresponding concrete model as an RDF Schema. The Xpetal tool helps to model files by mapping UML attributes and association roles to RDF properties.

The generated mapping rules are applied to the elements of the file to be converted. The elements to be converted comprise elements selected either with or without user intervention. The elements to be converted further comprise elements identified, based on the selected elements, by an element identification module 304.

The identified elements are then provided to a conversion module 306. Conversion module 306 converts the identified elements based on the first standard to elements based on the second standard, according to the generated mapping rules. The conversion involves identifying the applicable mapping rule for each element to be converted, and then proceeds by generating converted elements, based on the applicable mapping rules and the identified elements. The converted elements are subsequently processed by a post-processing module 308. Post-processing module 308 modifies the generated file by applying post-processing rules to the generated file. The post-processing rules help modify the converted elements or add elements to the converted elements to obtain a file that is in accordance with the second standard.

Figure 4:
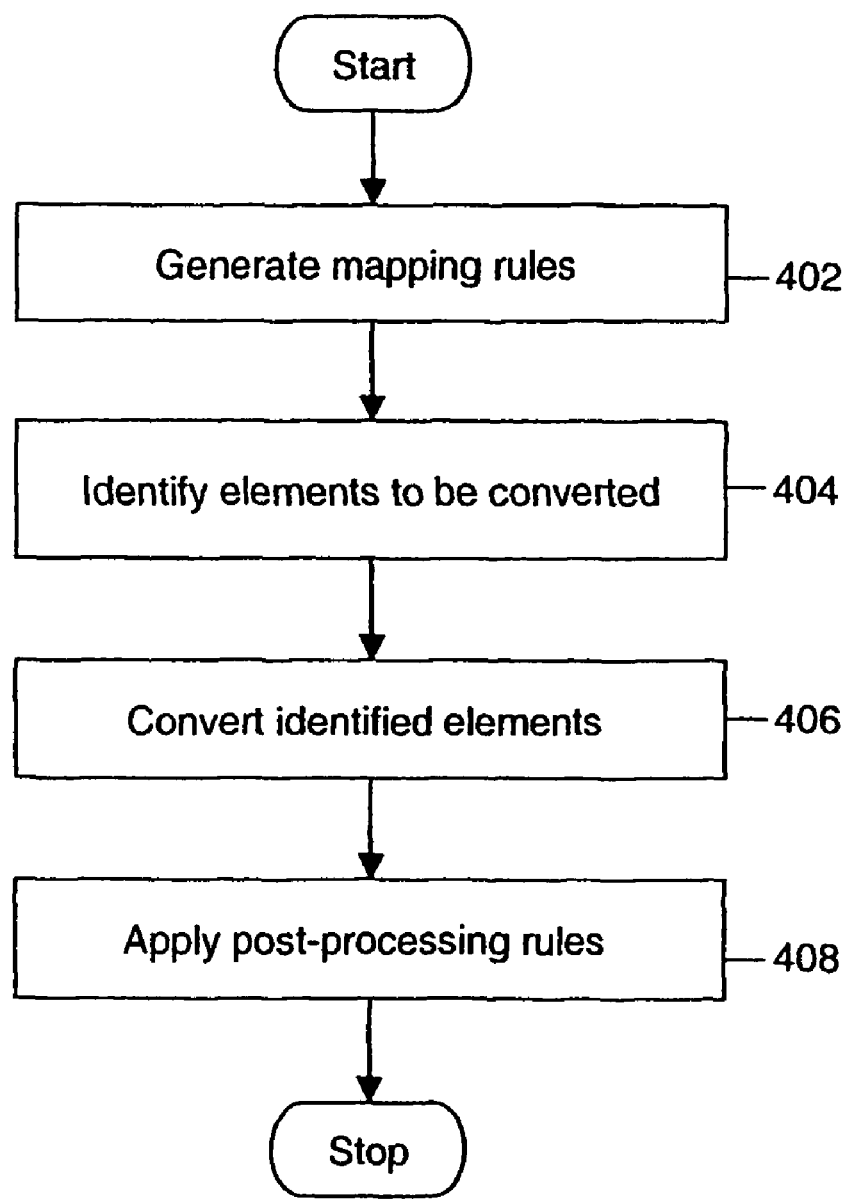
FIG. 4 is an exemplary flowchart depicting a method of converting a file in the first standard to a file in the second standard, according to an exemplary embodiment.

FIG. 4 is a flow chart depicting a method of converting a file in the first standard to a file in the second standard, according to an exemplary embodiment. At step 402, the mapping rules are generated based on the UML mappings model. The mapping rules are generated by semi-automatic converter 106 and can be coded according to the RDF schema. The mapping rules can be based on the two standards, IEC 61970 and IEC 61850, and can be formed, based on the relationships between various elements of the UML models that are based on the two standards. The relationships may involve, for example, one-to-many mapping, many-to-one mapping, one-to-one mapping, or no mapping. For a given version of the three UML models, this mapping rules generation needs to be performed only once, as explained above.

At step 404, elements to be converted are identified. The identification of the elements to be converted can be carried out either with or without the aid of user intervention. This step is explained in detail with reference to FIG. 5.

At step 406, the identified elements are converted, based upon the generated mapping rules. The conversion involves the generation of elements, based on the applicable mapping rules. The generated elements are called converted elements. This step is described in detail with reference to FIG. 6.

At step 408, post-processing rules are applied to the converted elements to create an output file. In an embodiment, the post-processing rules may be required, for example, to generate a new element based on the second standard. Such a scenario may occur in the case of optional elements. For example, element 'Bay' is optional in IEC 61970, and its corresponding element in IEC 61850, also called 'Bay', is mandatory. Therefore, to create an output file that conforms to the second standard, i.e., IEC 61850 for this example, element 'Bay' is deduced from other identified elements based on IEC 61970. For example, elements 'VoltageLevel' and 'Equipment' can be used to deduce element 'Bay'. It is to be noted that the post-processing rules may call for help from a user.

The post-processing rules may also, for example, be used to modify the converted or the generated elements. This modification is based on either of the two standards. The modification can also be brought about by user intervention.

The application of the post-processing rules completes the conversion of a file based on the first standard to an output file based on the second standard. The output file is based on the converted elements, and the elements generated based on the post-processing rules.

Figure 5:
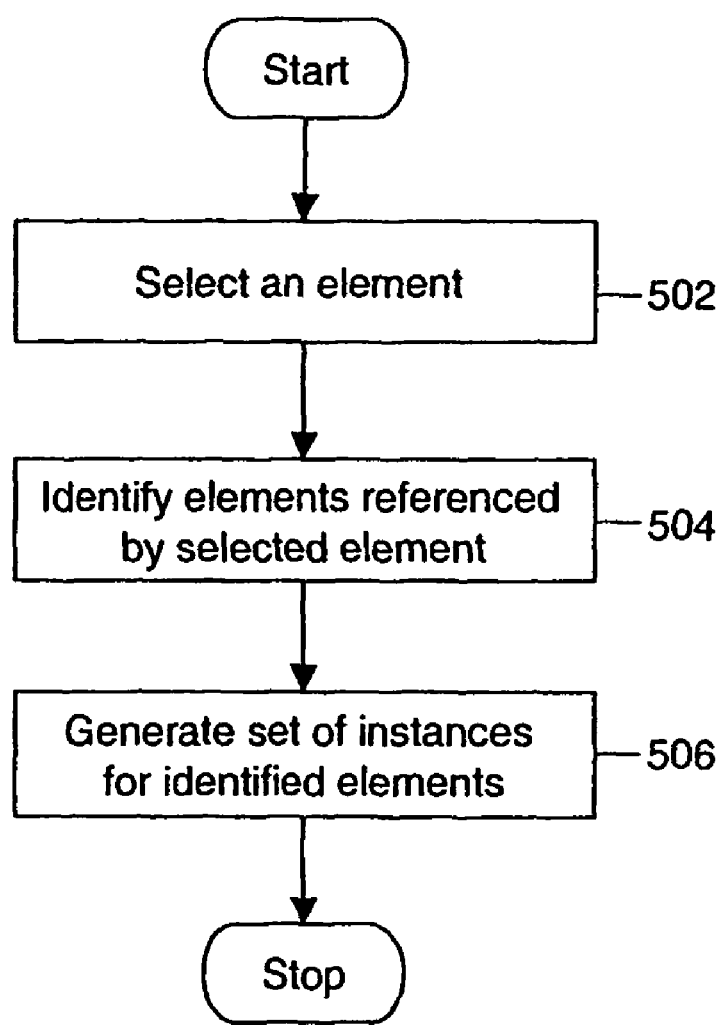
FIG. 5 is an exemplary flowchart depicting a method of identifying elements to be converted, according to an exemplary embodiment.

FIG. 5 is a flowchart depicting a method of identifying the elements to be converted. At step 502, an element is selected, as described earlier, either with or without user intervention. User intervention for the identification of the elements to be converted may comprise, for example, the selection of a substation from a CIMXML file to be converted. Further, such a selection is required if there are several substations. To select the substation to be converted, the user first opens a CIMXML instance file through the HMI, and then selects the substation to be converted from this file. However, if, for example, all the substations need to be converted, then user intervention is not required.

At step 504, all the elements referenced by the selected elements are identified. This means that at this step elements relevant to the conversion are extracted. The reference to or the association of the elements may, for example, be simple or cyclic. Simple reference relates to a uni-directional association between two elements with no cycles. An exemplary simple reference can include XML Schema elements that represent a tree, where the child elements can be contained by a parent element, and there is no reference from the child to the parent. SCL of IEC 61850 is an XML Schema involving such simple references. An exemplary cyclic reference can include CIMXML elements of IEC 61970. CIMXML is an RDF Schema, in which the association between two elements is bi-directional, i.e., references between ("parent and child") elements may be present. Thus a cyclic graph can be formed, which may have loops. Therefore, CIMXML elements may have both simple and cyclic references to other CIMXML elements.

The references are further explained by using the following examples. In the following examples, consider a conversion from IEC 61970 (CIMXML) to IEC 61850 (SCL). The element to be converted can be identified from a CIMXML instance file. Let it be denoted with A.

The algorithm for identifying simple reference searches for all non-processed elements from the CIMXML file, which are referenced by element A (top-down processing), or which reference A (bottom-up processing). An exemplary pseudo code for the simple association is as follows:

Notation

Ei: an element $\xi_A$: Set of elements $E_i$ previously processed $\xi_{A \rightarrow C}$: Set of all children C referenced by A $\xi_C$: Set of all elements not processed yet (initially, this is the set of all elements in the CIMXML instance file)

```
//Top-down processing for a given element A
for each C in ξ_{A→C} do {
    set parent-child relation between A and C
    add Ci to ξ_A
    remove C from ξ_C
}
//Bottom-up processing for a given element A
for each C in ξ_C do {
    if C has child A {
        set parent-child relation between A and C
        add Ci to ξ_A
        remove C from ξ_C
    }
}
```

A cyclic reference arises for a situation such as for a 'Terminal' element. The simple association algorithm cannot be applied in this case, since a child C can be referenced twice, from parent A and parent B. This case is treated as a separate case and the following algorithm is applied for identifying cyclic references, as is the case for the 'Terminal' element.

Notation
$E_i$: an element
$E_{ID}$: the unique identifier of an element
$ξ_A$: Set of elements $E_i$ previously processed (Hash table key=$E_{ID}$, value=$E_i$).
$ξ_{A→C}$: Set of all children $C_{ID}$ referenced by A (Hash table key=$C_{ID}$, value=$A_{ID}$).
$ξ_{B→C}$: Set of all children $C_{ID}$ referenced by B (Hash table key=$C_{ID}$, value=$B_{ID}$)
$ξ_C$: Set of all elements not processed yet
Initialisation (given a child of type C)
add all child $C_{ID}$ of A to $ξ_{A→C}$
add all child $C_{ID}$ of B to $ξ_{B→C}$
Algorithm

```
//Bottom-up processing
for each C in ξ_C do {
    remove C from ξ_C
    if C has both child A and B {
        if child A ∈ ξ_A {
            set parent-child relation between A and C
            if C_{ID} ∈ ξ_{A→C} remove C_{ID} from ξ_{A→C}
        } else {
            set parent-child relation between A and C
        }
        if child B ∈ ξ_A {
            set parent-child relation between B and C
            if C_{ID} ∈ ξ_{B→C} remove C_{ID} from ξ_{B→C}
        } else {
            set parent-child relation between B and C
        }
    } else if C has child A and A ∈ ξ_A {
        set parent-child relation between A and C
        if C_{ID} ∈ ξ_{A→C} remove C_{ID} from ξ_{A→C}
        if ∃ B referencing C do {
            set parent-child relation between B and C
            remove C_{ID} from ξ_{B→C}
        }
    } else if C has child B and B ∈ ξ_A {
        set parent-child relation between B and C
        if C_{ID} ∈ ξ_{B→C} remove C_{ID} from ξ_{B→C}
        if ∃ A referencing C do {
            set parent-child relation between A and C
            remove C_{ID} from ξ_{A→C}
        }
    //Top-down processing
    } else if A has child C do {
        set parent-child relation between A and C
        remove C_{ID} from ξ_{A→C}
        if ∃ B referencing C do {
            set parent-child relation between B and C
            remove C from ξ_{B→C}
        }
    } else if B has child C do {
        set parent-child relation between B and C
        remove C from ξ_{B→C}
    }
}
```

It is to be noted that the elements are identified recursively, e.g., the sub-elements that are identified when the step is first performed are considered the parent elements the second time the step is performed, and so on. This means that the step is performed till none of the selected elements reference any element that is not selected.

At step 506, instances of all the identified elements are created and stored into the file to be converted. This file is provided to semi-automatic converter 106, and it is coded according to CIMXML (RDF Schema), if the elements to be converted are based on IEC 61970. It is coded according to SCL (XML Schema) if the elements to be converted are based on IEC 61850.

Figure 6:
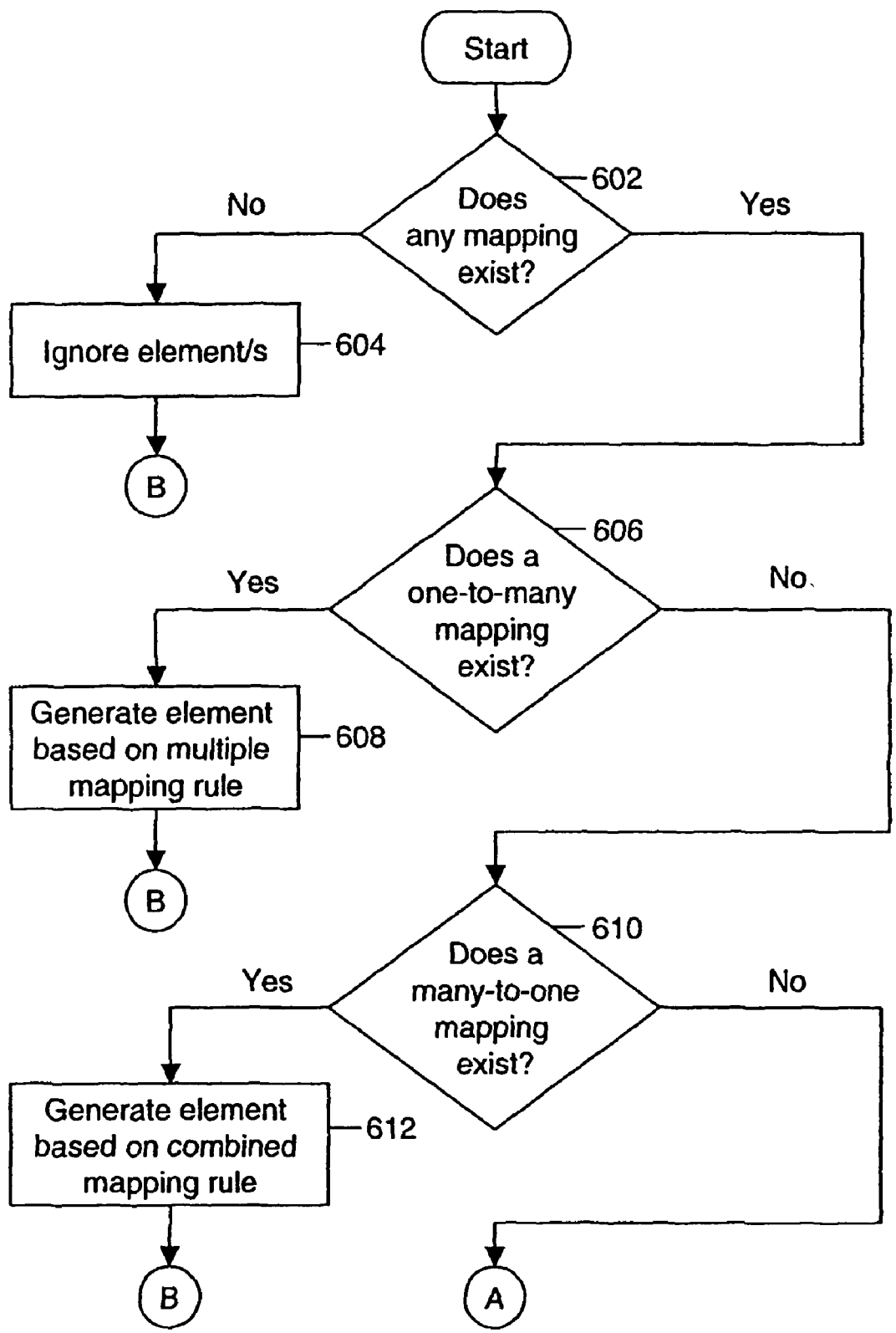
FIG. 6 and FIG. 7 are exemplary flowcharts depicting the conversion process, according to an exemplary embodiment.
Figure 7:
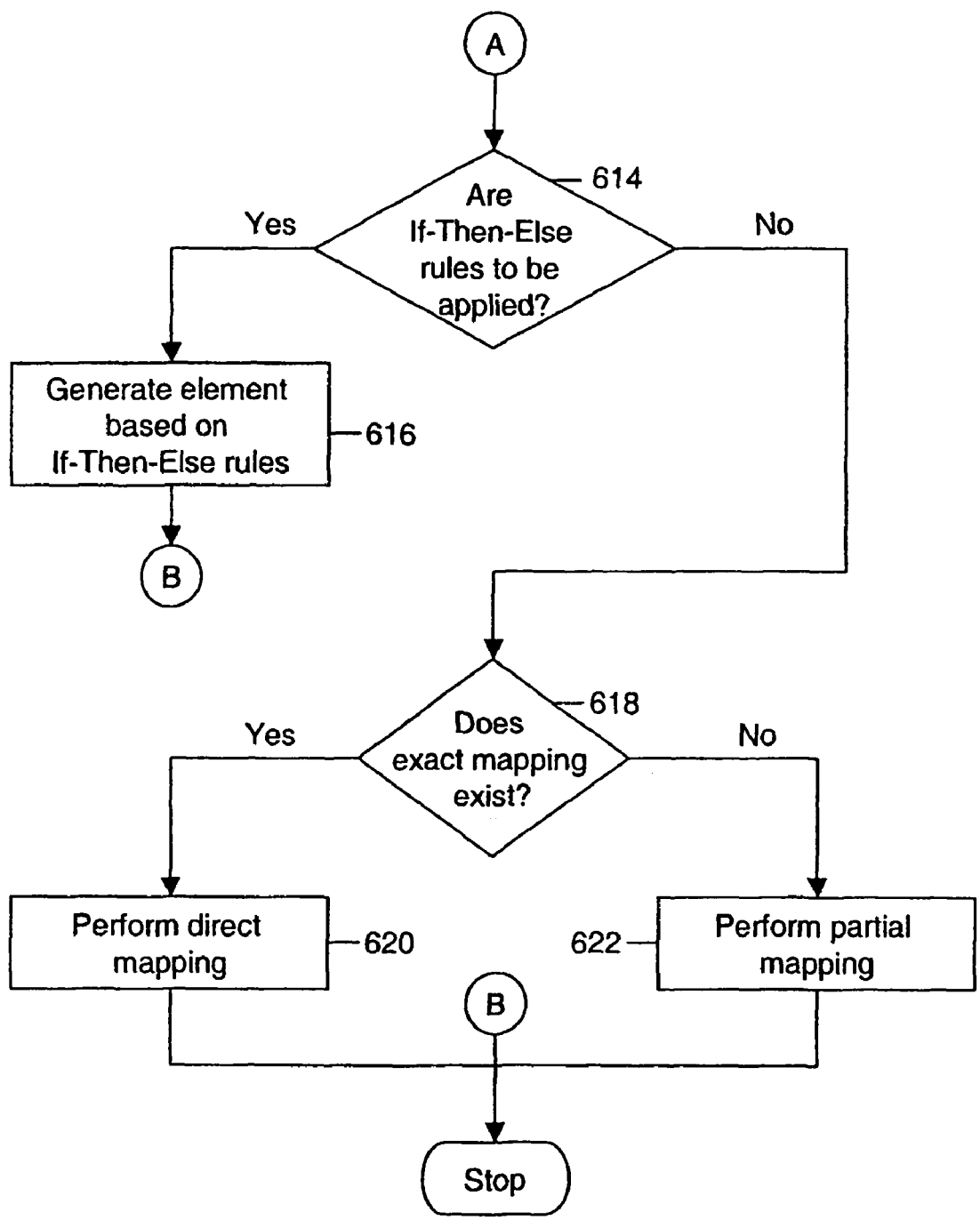

FIG. 6 and FIG. 7 show a flowchart depicting the conversion process, with reference to step 406, in accordance with an exemplary embodiment. The conversion rule for each of the identified elements is checked and converted elements are accordingly generated from the identified elements. The described steps can be performed for the identified elements. At step 602, it is checked if any mapping exists for the identified elements. At step 604, all the elements for which no mapping exists are ignored. No mapping exists, if for an identified element a corresponding element in the second standard does not exist. For example, element 'Battery' in IEC 61850 has no equivalent element in IEC 61970 and is ignored during conversion from IEC 61850 to IEC 61970. The identified elements that are ignored are not considered for a further conversion process.

At step 606, it is checked if a one-to-many mapping exists. This type of mapping is known as multiple mapping. In this case, a single element from the first standard maps onto multiple elements from the second standard. If a one-to-many mapping exists, then step 608 is performed. At step 608, the multiple elements in the second standard are generated as the converted elements. These generated elements map onto an element in the first standard for which the multiple mapping rule is applicable. An example of such a multiple mapping is the conversion from IEC 61970 'Measurement' and the generation of one 'VoltageTransformer' and two 'Terminal' elements in IEC 61850.

At step 610, it is checked if a many-to-one mapping exists. This type of mapping is known as combined mapping. In this case, multiple elements from the first standard map onto a single element from the second standard, e.g., multiple identified elements are combined to generate one converted element. If many-to-one mapping exists, step 612 is performed. At step 612, an element in the second standard corresponding to multiple elements in the first standard is generated. An example of such a combined mapping is the conversion from IEC 61850 'CurrentTransformer' and two 'Terminal' elements into an IEC 61970 'Measurement' element.

At step 614, it is checked if a conditional mapping in the form of If-Then-Else rules needs to be applied. These rules may call for user intervention. If the check is true, the elements based on the second standard are generated at step 616 by using these rules. This conversion depends on certain attributes and the If-Then-Else rules are used to check these attributes. For example, either of elements 'Disconnector', 'LoadBreakSwitch' and 'GroundDisconnector' in IEC 61970 can be converted into a 'CircuitSwitch' element in IEC 61850, while appropriately setting the attribute value 'CircuitSwitch.SwTyp'.

At step 618, it is checked if an exact mapping exists. According to this type of mapping, an element based on the first standard can be directly converted to an element based on the second standard. If an exact mapping exists, then step 620 is performed. At step 620, an element based on the second standard is generated by the direct conversion of an element based on the fist standard. For example, element 'Breaker' in IEC 61970 corresponds to the element 'Circuit Breaker' in IEC 61850, and hence, a direct conversion is possible.

If at step 618, it is found that exact mapping does not exist, step 622 is performed. At step 622, partial mapping rules are used for conversion. According to this type of mapping, only a part of an identified element can be converted into the other format. The relevant attributes are translated, while the others are ignored. Therefore, the converted elements generated according to this mapping rule describe only a part of the identified element to which the partial mapping rule is applied. For instance, protection devices from IEC 61850 (IED Section of SCL) can be abbreviated in their IEC 61970 counterparts, 'ProtectionEquipment'; hence partial mapping may be required.

Exemplary embodiments of a semi-automatic converter to convert files based on IEC 61970 to IEC 61850, and vice versa, and a method for performing the conversions are disclosed. It facilitates the configuration for the inter-operability of systems based on IEC 61970 to IEC 61850. The semi-automatic converter has the functionality of interpreting the mapping of the abstract UML models of the two standards. Further, it automatically creates the mapping rules, based on the mapping. These mapping rules are used by the semi-automatic converter to convert a file based on the first standard to a file based on the second standard, and vice versa. The semi-automatic converter also has an HMI that facilitates user intervention. The user intervention may be used for the selection of the elements to be converted and in applying post-processing rules.

The exemplary system, as disclosed or any of its components, may be embodied in the form of a computer system. An exemplary computer system can include a general-purpose computer, a programmed microprocessor, a micro-controller, a peripheral integrated circuit element, and other devices or arrangements of devices that are capable of implementing the steps that constitute the exemplary method as disclosed.

The computer system comprises a computer, an input device, and a display unit and may have access to the Internet. Computer comprises a microprocessor. Microprocessor is connected to a communication bus. Computer also includes a memory. Memory may include Random Access Memory (RAM) and Read Only Memory (ROM). Computer system further comprises storage device. It can be a hard disk drive or a removable storage drive such as a floppy disk drive, optical disk drive and the like. Storage device can also be other similar means for loading computer programs or other instructions into the computer system.

The computer system executes a set of instructions that are stored in one or more storage elements, in order to process input data. The storage elements may also hold data or other information as desired. The storage element may be in the form of an information source or a physical memory element present in the processing machine.

The set of instructions may include various commands that instruct the processing machine to perform specific tasks such as the steps that constitute the exemplary method as disclosed. The set of instructions may be in the form of a software program. The software may be in various forms such as system software or application software. Further, the software might be in the form of a collection of separate programs, a program module with a larger program or a portion of a program module. The software might also include modular programming in the form of object-oriented programming. In particular the modules of the semi-automatic converter may be coded in a high level language such as, for example, C, C++, C#, and Java. The processing of input data by the processing machine may be in response to user commands, or in response to results of previous processing or in response to a request made by another processing machine.

While the exemplary embodiments have been illustrated and described, it will be clear that the present invention is not limited to these embodiments only. Numerous modifications, changes, variations, substitutions and equivalents will be apparent to those skilled in the art without departing from the spirit and scope of the present invention as described in the claims.

LIST OF DESIGNATIONS

100 Utility Control System
102 System based on IEC 61970
104 System based on IEC 61850
106 Semi-automatic Converter
202 File based on IEC 970
204 File based on IEC 61850
206 Mappings in UML
208 UML Model of IEC 61970
210 UML Model of IEC 61850
212 Mapping Rules
214 User
302 Mapping Rule Generation Module
304 Element Identification Module
306 Conversion Module
308 Post-processing Module
402 Step of Generating Mapping Rules
404 Step of Identifying Elements to be converted
406 Step of Converting Identified Elements
408 Step of Applying Post-Processing Rules
502 Step of Selecting an Element
504 Step of Identifying Elements Referenced by Selected Element
506 Step of Generating Set of Instances for Identified Elements
602 Step of Checking if any Mapping Exists
604 Step of Ignoring Elements
606 Step of Checking if a One-To-Many Mapping Exists
608 Step of Mapping Multiple Elements onto one
610 Step of Checking if a Many-To-One Mapping Exists
612 Step of Mapping one Element onto Multiple Elements
614 Step of Checking if If-Then-Else Rules Are To Be Applied
616 Step of Generating Element Based on If-Then-Else Rules
618 Step of Checking if Exact Mapping Exists
620 Step of Generating Element Based on Direct Mapping
622 Step of Generating Element Based on Partial Mapping

The invention claimed is:

1. A method of converting elements of a file that is based on a first standard to elements of a file that is based on a second standard, the standards being IEC 61970 and IEC 61850, a file in IEC 61970 being coded according to CIMXML (RDF Schema) and a file in IEC 61850 being coded according to SCL (XML Schema), the data in each file being modelled by using a UML model for the corresponding standard, and the conversion being performed by using mapping rules generated based on the UML models of the two standards and a UML model of mappings between the two standards; comprising:

selecting at least one element of the file that is based on the first standard;

identifying and selecting all the elements referenced by the at least one selected element;

recursively identifying and selecting all the elements referenced by the previously selected elements until none of the selected elements reference any element that is not selected;

converting the selected elements, the conversion being performed by using the mapping rules, and applying post-processing rules to the converted elements to generate the file that is based on the second standard.

2. The method according to claim 1, comprising the step of generating an element in the second standard by a direct conversion if there exists an exact mapping in the mapping rules for an identified element.

3. The method according to claim 1, comprising the step of generating an element in the second standard by conversion of a part of an identified element in the first standard, if there exists a partial mapping in the mapping rules for the identified element.

4. The method according to claim 1, comprising the step of ignoring the identified element, if there exists no mapping in the mapping rules for an identified element.

5. The method according to claim 1, comprising the step of generating a plurality of elements in the second standard if there exists more than one mapping in the mapping rules for an identified element.

6. The method according to claim 1, comprising the step of generating an element in the second standard, wherein the generated element maps onto more than one identified element.

7. The method according to claim 1, comprising the step of generating at least one element based on If-Then-Else rules.

8. The method according to claim 1, wherein the application of the post-processing rules comprises the step of generating at least one element based on the two standards, wherein the generated file is based on the converted elements and the generated elements.

9. The method according to claim 1, wherein the application of the post-processing rules comprises the step of generating at least one element by user intervention in accordance with the second standard.

10. The method according to claim 1, wherein the application of the post-processing rules comprises the step of modifying at least one converted element based on the two standards.

11. The method according to claim 1, wherein the application of the post-processing rules comprises the step of modifying at least one element by user intervention in accordance with the second standard.

12. The method according to claim 1, wherein the application of the post-processing rules comprises deducing a mandatory element in the second standard, which corresponds to an optional element in the first standard, from other identified elements in the first standard.

* * * * *